US007139525B2

(12) United States Patent
Satoh

(10) Patent No.: US 7,139,525 B2
(45) Date of Patent: *Nov. 21, 2006

(54) TIME SYNCHRONIZATION SYSTEM, SATELLITE SYSTEM APPLIED TO THE TIME SYNCHRONIZATION SYSTEM, GROUND SYSTEM APPLIED IN THE TIME SYNCHRONIZATION SYSTEM, TIME SYNCHRONIZATION METHOD AND A COMPUTER-READABLE RECORDING MEDIUM WITH A PROGRAM

(75) Inventor: Keiji Satoh, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/651,954

(22) Filed: Sep. 2, 2003

(65) Prior Publication Data

US 2004/0043725 A1   Mar. 4, 2004

Related U.S. Application Data

(63) Continuation of application No. 09/397,866, filed on Sep. 17, 1999, now Pat. No. 6,807,398.

(30) Foreign Application Priority Data

Oct. 27, 1998 (JP) .................................. 10-305714

(51) Int. Cl.
*H04B 7/185* (2006.01)
(52) U.S. Cl. .................... 455/12.1; 455/13.2; 455/502; 370/316; 370/324

(58) Field of Classification Search ............... 455/13.2, 455/12.1, 502, 517; 370/229, 324, 325, 316, 370/317, 318
See application file for complete search history.

(56) References Cited

U.S. PATENT DOCUMENTS

| 3,818,453 | A | * | 6/1974 | Schmidt et al. ............. 370/324 |
| 4,004,098 | A | * | 1/1977 | Shimasaki ................... 370/325 |
| 4,262,356 | A | | 4/1981 | Lautier et al. |
| 4,347,606 | A | | 8/1982 | Hoogeveen |
| 4,792,963 | A | | 12/1988 | Campanella et al. |
| 4,860,001 | A | | 8/1989 | Yamanaka et al. |
| 5,220,676 | A | | 6/1993 | LoGalbo et al. |
| 5,402,424 | A | | 3/1995 | Kou |
| 5,422,863 | A | | 6/1995 | Minowa et al. |
| 5,628,050 | A | * | 5/1997 | McGraw et al. ........... 455/12.1 |
| 5,661,764 | A | | 8/1997 | Nakajima |

(Continued)

FOREIGN PATENT DOCUMENTS

JP          3-155296     *   7/1991

(Continued)

OTHER PUBLICATIONS

U.S. Appl. No. 09/397,866, filed Sep. 17, 1999, Keiji Satoh.

*Primary Examiner*—Steve M. D'Agosta
(74) *Attorney, Agent, or Firm*—Staas & Halsey LLP

(57) ABSTRACT

In a satellite system, a time frame to be used for establishing a time correlation between the satellite system and a ground station is inserted between the transmission frames at an arbitrary timing. The ground station computes the time at which the data was generated in the satellite system from this time frame and establishes a time correlation with the satellite time by using only this time frame.

8 Claims, 15 Drawing Sheets

U.S. PATENT DOCUMENTS

| | | |
|---|---|---|
| 5,673,296 A | 9/1997 | Ohgane |
| 5,742,908 A * | 4/1998 | Dent .......................... 455/517 |
| 5,757,786 A | 5/1998 | Joo |
| 5,878,034 A | 3/1999 | Hershey et al. |
| 5,910,945 A * | 6/1999 | Garrison et al. ............ 370/324 |
| 5,991,279 A | 11/1999 | Haugli et al. |
| 6,442,135 B1 * | 8/2002 | Ofek .......................... 370/229 |
| 6,807,298 B1 * | 10/2004 | Park et al. .................. 382/165 |

FOREIGN PATENT DOCUMENTS

| | | |
|---|---|---|
| JP | 03-218494 | 9/1991 |
| JP | 4-319695 | 11/1992 |
| JP | 5273365 | 10/1993 |
| JP | 10-177081 | 6/1998 |
| JP | 63-213099 | 9/1998 |

\* cited by examiner

FIG.1
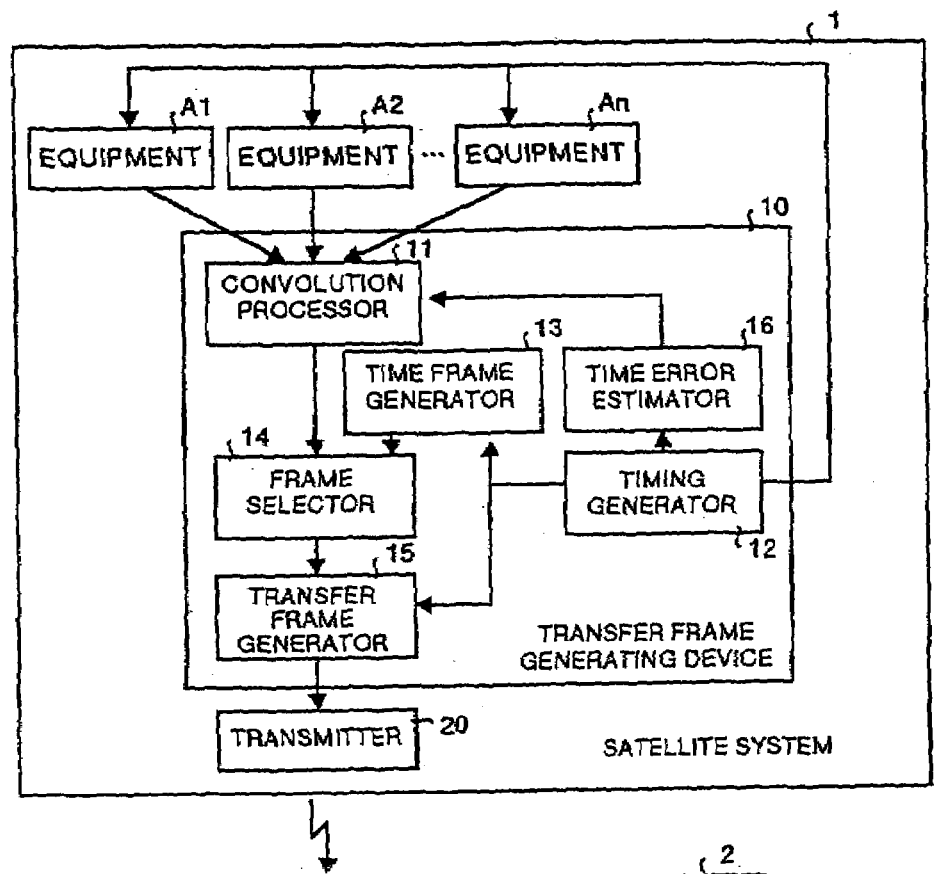
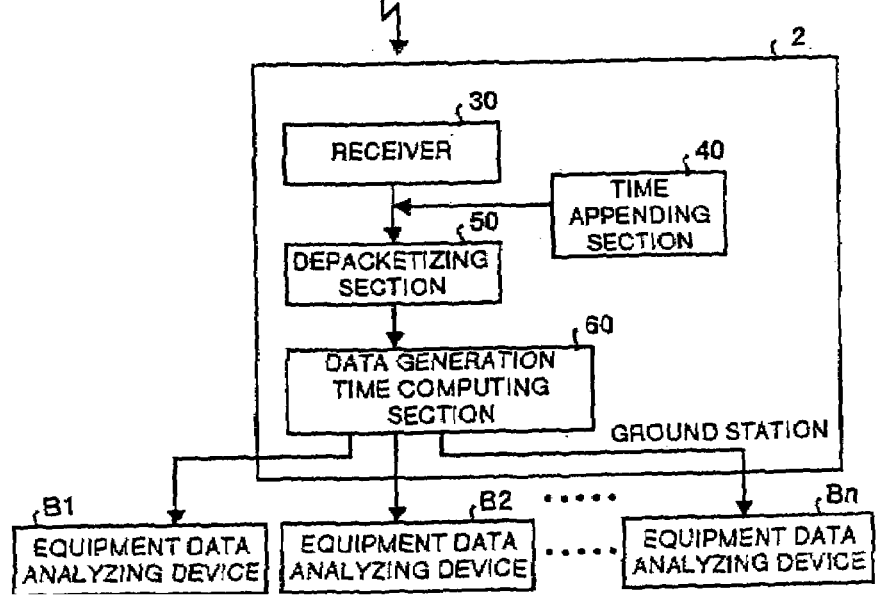

TIME SYNCHRONIZATION SYSTEM, SATELLITE SYSTEM APPLIED TO THE TIME SYNCHRONIZATION SYSTEM, GROUND SYSTEM APPLIED IN THE TIME SYNCHRONIZATION SYSTEM, TIME SYNCHRONIZATION METHOD AND A COMPUTER-READABLE RECORDING MEDIUM WITH A PROGRAM

This application is a Continuation Application of application Ser. No. 09/397,866, filed Sep. 17, 1999 now U.S. Pat. No. 6,807,398 and herein incorporated by reference.

FIELD OF THE INVENTION

The present invention relates to a time synchronization technology using a satellite. More specifically, this invention relates to a time synchronization system for synchronizing the time in the satellite system with the time in the ground system, a satellite system applied in the time synchronization system, a ground system applied in the time synchronization system, a time synchronization method, and a computer-readable recording medium with a program for making a computer execute the method.

BACKGROUND OF THE INVENTION

When astronomical events are observed using a remote system such as a satellite, it is required to synchronize the time in the satellite system with that of the ground time in order to know the time of generation of observed events. With recent advance in the field of computers, high speed data processing has become possible in the satellite system, and also an advanced protocol such as packet telemetry based on recommendation by CCSDS (Consultative Committee for Space Data Systems) for communications between a satellite system and a ground station are used.

Because of the necessity of data processing in a satellite or employment of packet telemetry, ambiguous delay in time interval is generated from the time when data is acquired until the time when the data is transmitted to the ground. Therefore, it is difficult to estimate the time of generation of an event from a time when the data is received at the ground station. On the other hand, it is required to know the accurate time of generation of data while realizing a high speed data processing in the satellite system or an advanced protocol such as packet telemetry. Especially in astronomical observation, in order to verify the result of observation to that acquired by other satellites or that obtained on the ground, precision in time measurement of the order of microseconds is required.

In the conventional technology, observed data is sampled according to the timing generated by an apparatus for controlling the timing of operations of the entire satellite system. The data is inserted at a fixed location in the transfer frame and the time at which the data was generated is determined from the time when the transfer frame is received. On the other hand, a system in which request for the current time is made when required to a device which controls the system time, or a system in which standard time is determined by using data input time into a device generating a transfer frame is employed in a satellite system employing the packet telemetry therein.

In recent years, time is determined by using the GPS (Global Positioning System). FIG. 15 shows the commonly used GPS system. The system shown in FIG. 15 is a satellite system in which an orbiting satellite 105 acquires the signals, namely the observation data, from four GPS satellites 101 to 104. In this satellite system, the satellite 105 acquires apparent distances between itself and the GPS satellites 101 to 104 based on the acquired observation data, and obtains four unknown parameters i.e. its own position (x, y, z) and the difference between its own time and the time in the GPS satellites. With this method, an accurate time can be acquired in the satellite 105.

In the satellite system described above, in association with the advance in the computer technology, sophisticated processing such as data compression or data extraction has become possible, so that data length of the observed data or the like changes, and sometimes waste of resources occurs in data transfer when a fixed data format like that in the conventional technology is used. Efforts have been made in order to improve the efficiency in data transmission by employing packet telemetry such as CCSDS.

However, in the satellite system described above, because the complicated data processing such as the packet telemetry like CCSDS is employed, a delay is generated until the acquired data is packetized, or ambiguous delay is generated until a packet including data is actually edited into the transfer frame. Further, fluctuations in time from generation up to transfer of data to the ground station becomes larger, so that it is difficult to decide the time at which the data was generated from the time at which the data is received.

In a system in which time is required to be acquired by the a device which manages the time in the satellite, non-uniformity of around a couple of tens of microseconds is included in association with realization of a protocol for acquiring time, so that an error which is not desirable in a system requiring accurate time may be generated.

High precision time determination can be realized with GPS shown in FIG. 15 having been employed and becoming popular in recent years. However, the system configuration is very complicated. Further, in the example shown in FIG. 15, because the satellite 105 itself rotates around the Earth at a high speed a Doppler shift is generated. This Doppler shift makes the use of GPS on the ground difficult.

SUMMARY OF THE INVENTION

To solve the problems as described above in the conventional technology, it is an object of the present invention to provide a time synchronization system capable of determining time of generation of data with high precision and also with a simple configuration. It is also an object of the present invention to provide, a satellite system applied in the time synchronization system, a ground system applied in the time synchronization system, a time synchronization method, and a computer-readable recording medium with program for making a computer execute the method recorded therein.

In the present invention, the satellite system inserts a time frame to be used for establishing a time correlation between the satellite system and the ground system between the transmission frames at an arbitrary timing, and the ground system acquires the time of generation of data in the satellite system from this time frame. Thus, a time correlation between the time in the satellite and that on the ground can be established only by using the time frame, so that time of generation of data can precisely be determined with a simple configuration.

Further, the transmission frame is generated by packetizing the data generated in the satellite system, so that even complicated data processing can be executed.

Further, the satellite system generates the transmission frame utilizing the observation data generated in a plurality of equipments mounted thereon, so that the ground system can acquire a result of observation in the satellite.

Further, the satellite system distributes a time clock to each of the equipment and synchronizes the internal time in satellite (satellite time) with of the internal time in each of the equipments, so that a centralized time management in the satellite system can be realized.

Further, the satellite system appends the satellite time to the data generated in each of the equipment, so that time management of data can be realized in the satellite system.

Further, the satellite system generates the satellite time by counting clocks which are synchronized to a bit rate of the transmission frames, and set an entire portion of the satellite time below the time required for transmission of one frame to zero at the head of a transmission frame, so that a fraction of satellite time is eliminated and precision in time synchronization can be improved.

Further, in the satellite system, satellite time is corrected depending upon the changes in the temperature, so that time error due to temperature conditions inside the satellite system can be suppressed.

Further, the satellite system inserts satellite time at two different timings between the transmission frames, while the ground system acquires an average frequency of satellite time from the time interval between these two satellite times inserted between the transmission frames and a time interval between the ground times corresponding to these two satellite times. Then, the ground system corrects the time of generation of data in the satellite from the above average frequency and the amount of drift from the official frequency of the satellite time. With this, error in time progress in the satellite system and that in the ground system can be corrected, which makes it possible to acquire accurate time of generation of data in the satellite system.

Further, the satellite system estimates the amount of change in the frequency to be used for acquiring the satellite time according to a change of the internal temperature, and the ground system corrects the time of generation of data in the satellite system taking into account the estimated change in the frequency. Thus, the ground system can acquire the accurate time of generation of the data by taking into account the satellite time in the satellite system.

In the present invention, a time frame to be used for establishing a time correlation between the satellite system and the ground system is generated, and this time frame is inserted, when the frames are transmitted, between the transmission frames at an arbitrary timing to generated a transfer frame. Therefore, time correlation between the satellite time and the ground time can be established in the ground system utilizing this time frame.

Further, a convolution processor is provided for generating the transfer frames by packetizing the generated data, so that even complicated data processing can be executed.

In the present invention, the transmission frame is generated utilizing the observation data generated in a plurality of equipments mounted on the satellite system, so that a result of observation by the satellite system can be provided to the ground system.

Further, satellite time preserved in the satellite system is synchronized with the internal time in each of the equipment by distributing time clocks to each equipment, so that monolithic time management can be realized in the satellite system.

Further, satellite time is appended to data generated in each of the equipment, so that time management for each data can be realized in the satellite system.

Further, satellite time is generated by counting clocks each synchronized to a bit rate of the transfer frames, and an entire portion of satellite time below the time required for transfer of one frame is set to zero at the head of the transfer frames, so that a fraction of satellite time is eliminated and precision in synchronization can be improved.

Further, satellite time is corrected according to the changes in the temperature, so that a time error due to temperature conditions inside the satellite system can be suppressed.

In the present invention, time of generation of data in the satellite system is acquired according to a time frame inserted between received frames to be used for establishing a time correlation between the satellite system and the ground system. Thus, time correlation between the satellite system and ground system can be realized according to the time frame obtained from the satellite system, so that time of generation of data can precisely be determined with a simple configuration.

Further, an average frequency of satellite time is acquired from the time interval between two different satellite times and the time interval between the ground times corresponding to the two satellite times, and time of generation of data in the satellite system is corrected from this average frequency as well as from the amount of drift from then official frequency of satellite time. With this, error between time progress in the satellite system and that in the ground system can be corrected, so that an accurate time of generation of data in the satellite system can be acquired.

Further, time of generation of data in the satellite system is corrected by taking into account the change in the frequency estimated in the satellite system, so that accurate time of generation of data can be acquired by taking into account the satellite time in the satellite system.

In the present invention, a time frame to be used for is establishing a time correlation between the satellite system and the ground system is generated, and a transfer frame is generated, when frames are transmitted, by inserting the generated time frame at an arbitrary timing between the transmission frame. Thus, time correlation between the satellite time and ground time can be established based on this time frame, so that accurate time of generation of data can precisely be determined with a simple configuration.

In the present invention, when receiving the frames, time of generation of data in the satellite system is acquired from the time frame inserted between the received frames to be used for establishing a time correlation between the satellite system and the ground system, and data is analyzed according to the time of generation of data. Then a time correlation between the satellite system and ground system can be established according to the time frame obtained from the satellite system and data can be analyzed using an accurate time, so that a result of data analysis can be acquired based on accurate time in the satellite system.

In the present invention, processing for generation of a time frame to be used for establishing a time correlation between the satellite time and the ground system is executed, and then a transfer frame is generated by inserting, when transmitting the frames, this time frame at an arbitrary timing between the transmission frames. Thus, time correlation between the satellite system and the ground system can be established according to this time frame by using a computer program, so that time of generation of data can precisely be determined with a simple configuration.

In the present invention, when receiving the frames, time of generation of data in the satellite system is computed according to the time frame inserted between the received frames, to be used for establishing a time correlation between the satellite system and the ground system, and data is analyzed according to the computed time of generation of data. Then the data can be analyzed according to an accurate time by establishing a time correlation between the satellite time and the ground time according to the time frame obtained from the satellite system using a computer program, so that a result of analysis based on an accurate time can be acquired.

Other objects and features of this invention will become understood from the following description with reference to the accompanying drawings.

BRIEF DESCRIPTION OF THE DRAWINGS

FIG. 1 is a block diagram showing a general configuration of a time synchronization system according to one embodiment of the present invention;

DESCRIPTION OF THE PREFERRED EMBODIMENTS

Figure 2:
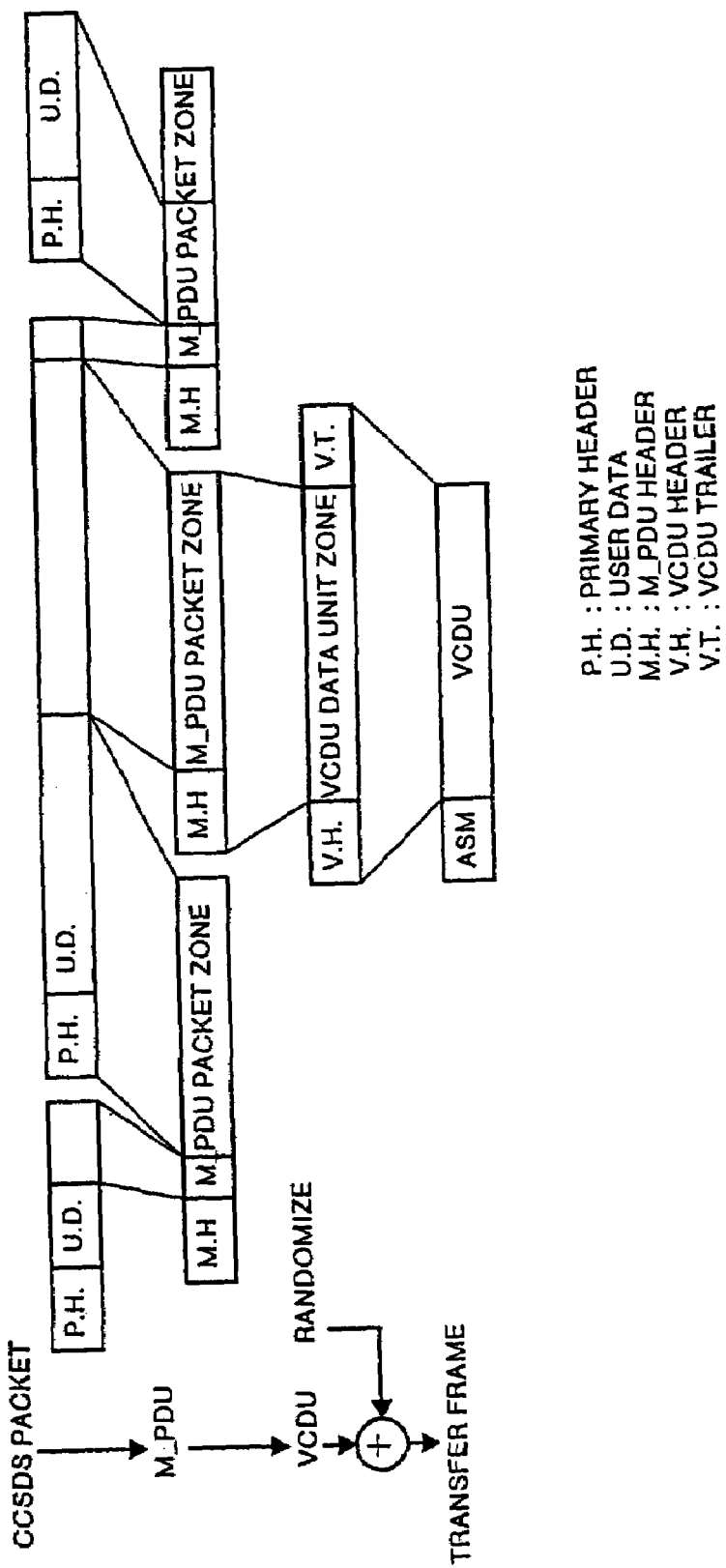
FIG. 2 shows how a transmission frame is generated in a satellite system.

Detailed description is made hereinafter for preferred embodiments of the time synchronization system, a satellite system applied in the time synchronization system, a ground system applied in the time synchronization system, a time synchronization method, and a computer readable recording medium with a program for making a computer execute the method recorded therein.

At first, configuration is described. FIG. 1 is a block diagram showing a time synchronization system according to one embodiment of the present invention. For instance, as shown in FIG. 1, the time synchronization system according to the present invention comprises a satellite system 1, a ground station 2, and ground system equipment data analyzing devices B1 to Bn.

The satellite system 1 comprises equipment A1, A2, . . . An (n: natural number) which generate the observation data, a transfer frame generating device 10 for generating a packetized transfer frame containing the observation data and the satellite system time, and a transmitter 20 for transmitting the generated transfer frame to the ground station 2.

The transfer frame generating device 10 comprises a convolution processor 11, a timing generator 12, a time frame generator 13, a frame selector, a transfer frame generator 15, and a time error estimator 16. The convolution processor 11 generates a flow of data in order to generate a transfer frame. The timing generator 12 generates a timing for controlling the timing of the entire satellite system 1.

The time frame generator 13 converts the time in the system into a frame based on the timing generated by the timing generator 12. The frame selector 14 selects an ordinary data frame or a time frame. The transfer frame generator 15 generates a transfer frame (VCDU) to be finally transferred to the transmitter 20. The time error estimator 16 estimates an error caused due to a change in the temperature and included in the timing generator 12.

The ground system 2 comprises a receiver 30, a time appending section 40, a depacketizing section 50, and a data generation time computing section 60. The receiver 30 receives the transmission frame transmitted from the satellite system 1. The time appending section 40 appends the time at which the transfer frame is received (Referred to as receiving time hereinafter) to the received transfer frame. The depacketizing section 50 depacketizes the received transfer frame received thereby to data for each equipment. The data generation time computing section 60 computes the time at which the data was generated (Referred to as data generation time hereinafter) with respect to the data for each equipment acquired by depacketizing with the depacketizing section 50 according to a time frame inserted by the satellite system 1 into the transfer frame and the receiving time appended in the receiving time appending section 40.

The equipment data analyzing devices B1 to Bn correspond to the equipment A1 to An respectively, and analyze the observation data generated in the respective equipment.

Figure 3:
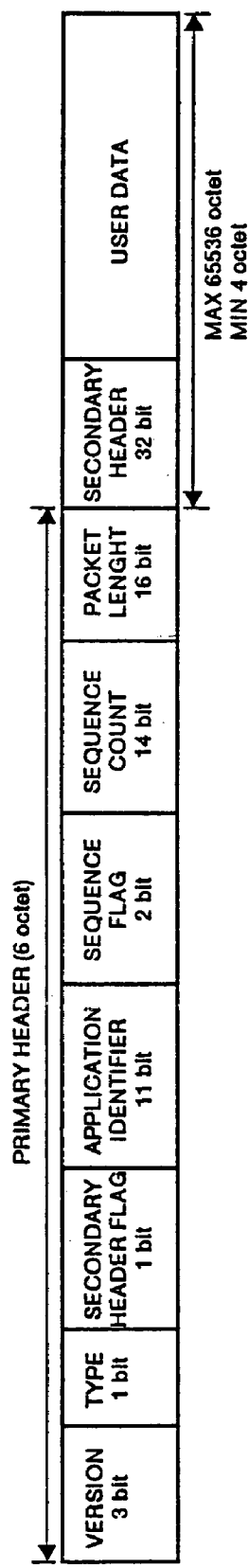
FIG. 3 explains the CCSDS packet format.
Figure 4:
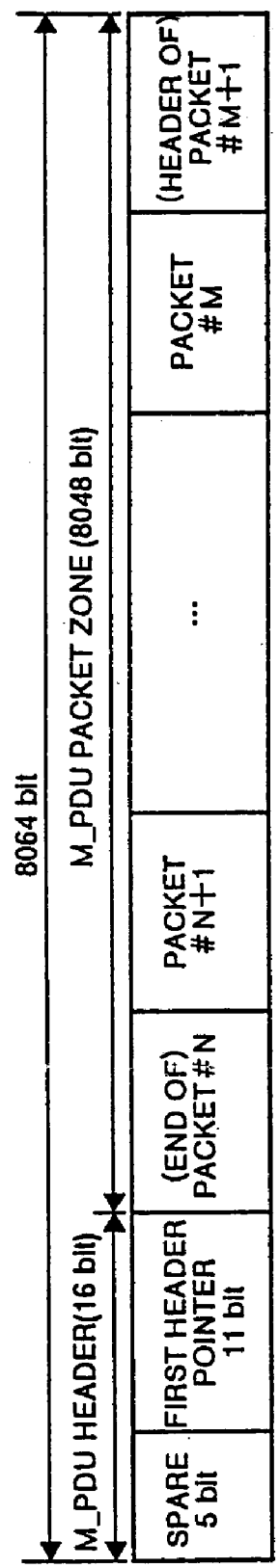
FIG. 4 explains the MPDU format.
Figure 5:
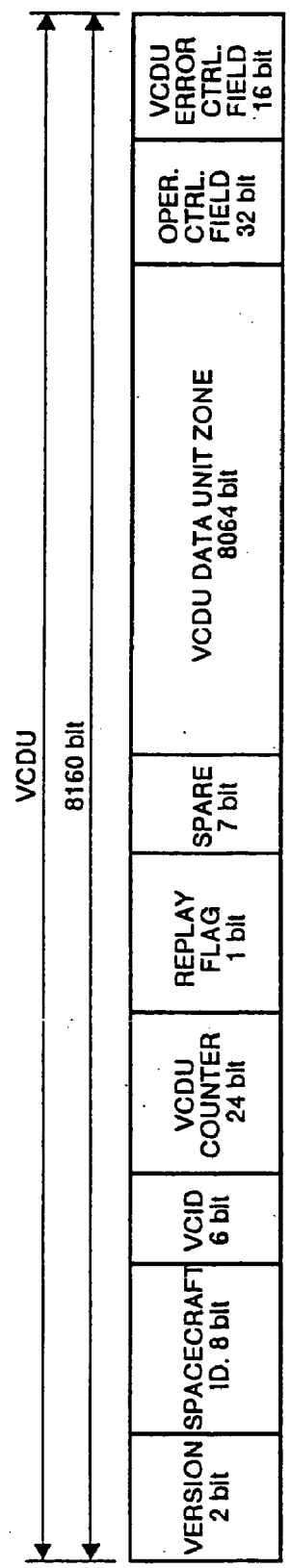
FIG. 5 explains the VCDU format.
Figure 6:
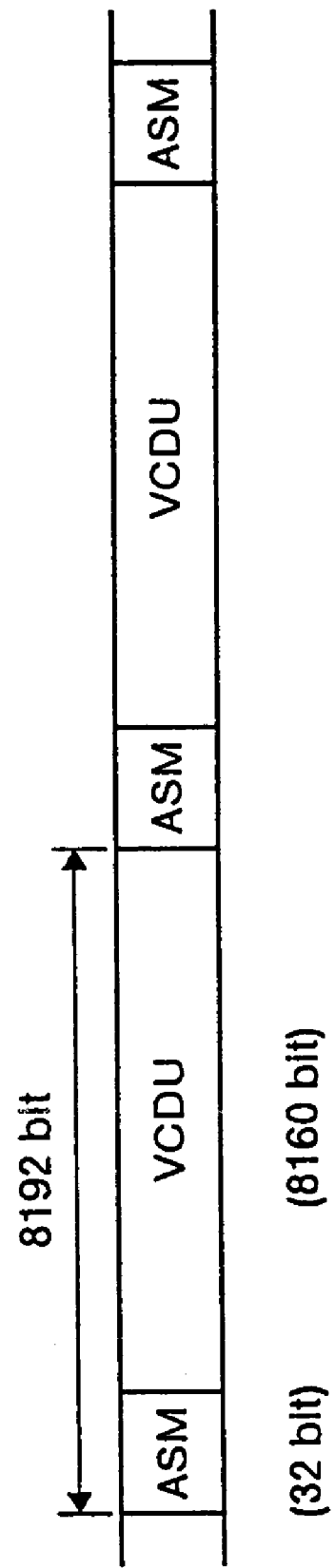
FIG. 6 explains the transmission frame format.

Next, a format of data applied in this time synchronization system is explained. FIG. 2 shows how a transfer frame is generated in the satellite system 1. FIG. 3 shows the CCSDS packet format, FIG. 4 shows the M_PDU (Multiplexing Protocol Data Unit) format, FIG. 5 shows the VCD (Virtual Channel Data Unit) format, and FIG. 6 shows the transfer frame format.

In this time synchronization system, the packet system based on the CCSDS recommendation is employed as a telemetry system. The transfer frame generating device 10 generates the format shown in FIG. 6, as shown in FIG. 2, by forming the M_PDU format shown in FIG. 4 generated by multiplexing the CCSDS packet shown in FIG. 3 and then forming the VCDU format shown in FIG. 5. The CCSDS packet comprises, as shown in FIG. 3, a 6-octet primary header, a secondary header (32 bits) and user data set within 4 octet to 65536 octet.

The primary header comprises areas for a version (3 bits), a type (1 bit), a secondary header flag (1 bit), an application identifier (11 bits), a sequence flag (2 bits), a sequence count (14 bits), and a packet length (16 bits).

A user data area of the CCSDS packet has a variable length, and information regarding its length is stored in the packet length area. Data indicating whether the secondary header is present or not is stored in the secondary header flag area. The application identifier area stores therein the ID appended to the CCSDS packets depending upon their type. By identifying this application identifier, it is possible to determine a device that generated the packet or the type of the packet or the like. This application identifier is used for synchronizing the time, and information regarding the satellite time for time synchronization is stored in the CCSDS packet.

The sequence count stored in the sequence count area is a counter appended to each CCSDS packet having the same application identifier. Whether any packet is missing or not can be identified by checking continuity of this sequence count. The sequence flag stored in the sequence flag area indicates whether data in the CCSDS packet is complete within one packet or the data is formed with a combination of packets.

As shown in FIG. 4, the M_PDU uses a format comprising a spare, a first header pointer, and a packet zone. As shown in FIG. 5, the VCDU uses a format comprising a version, a spacecraft ID, a VCID, a VCDU counter, a replay flag, a spare, a VCDU data unit zone, an OPER. CTRL. field, and a CDVU error CTRL. field. As shown in FIG. 6, the transfer frame uses a format comprising a ASM (Attached Sync. Marker) which is a frame synchronization code, and the VCDU described above.

The transfer frame format shown in FIG. 6 is a format of the data finally outputted from the satellite. This transfer frame format has the VCDU shown in FIG. 5. The VCDU data unit zone shown in FIG. 5 corresponds to the M_PDU format shown in FIG. 4. The VCID indicates the type of VCDU.

The VCID is provided for synchronizing the time, and includes a CCSDS packet for time synchronization. Stored in the CCSDS packet is information regarding the satellite time at the time when a header position of ASM (Refer to FIG. 6) to which the VCDU belongs) is outputted. In the ground station 2, receiving is performed with the transfer frame format shown in FIG. 6, and when the VCID for time synchronization is detected, receiving time of the ASM to which the VCID belongs is recorded.

When the inside of VCDU is decoded, a CCSDS packet having an APID dedicated for time synchronization is included in this VCDU, and the satellite time when the ASM is generated is stored in this CCDSD packet. Time correlation between the satellite system and the ground system can be established from the satellite time stored in the CCSDS packet and the receiving time on the ground.

Figure 7:
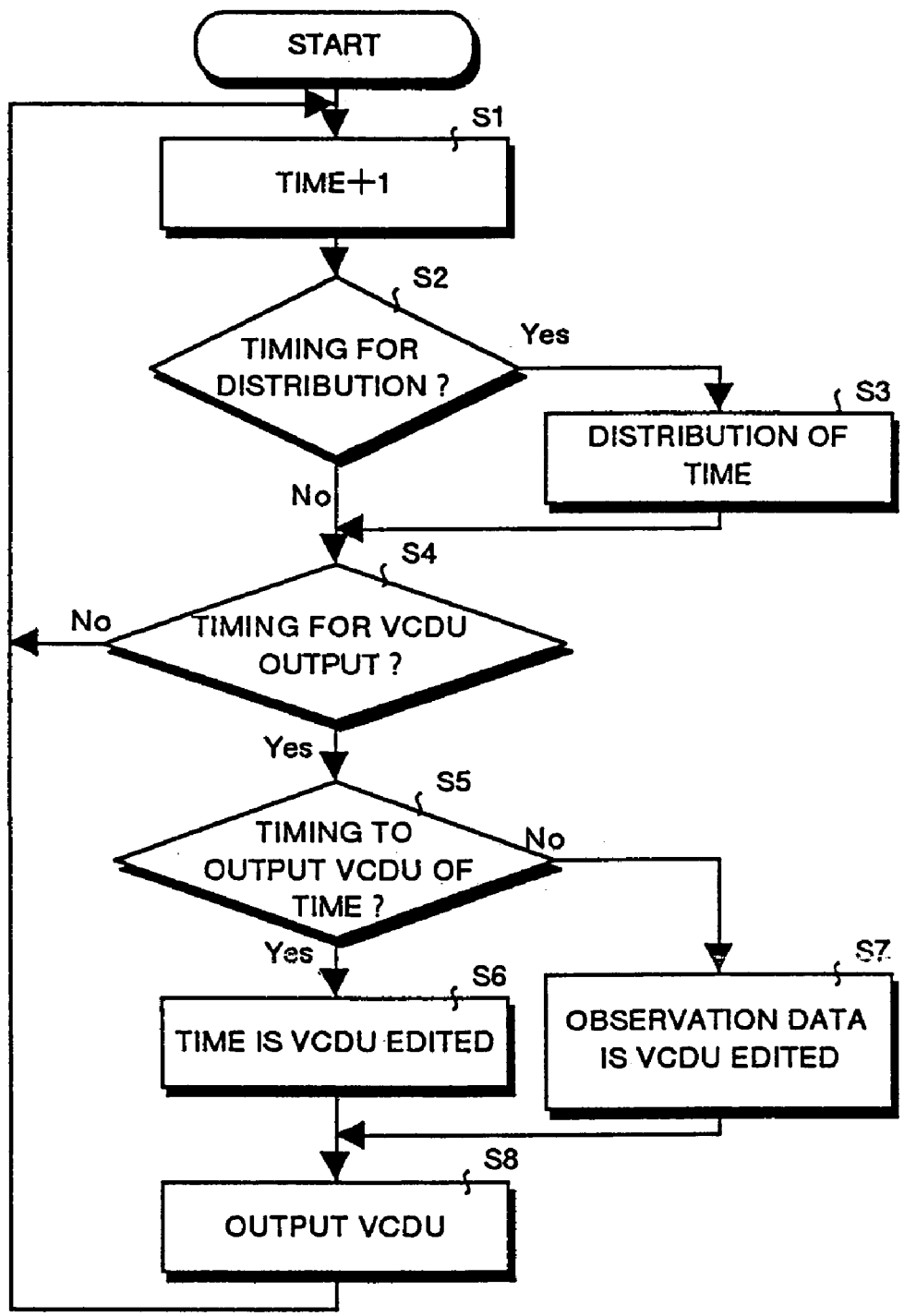
FIG. 7 is a flow chart showing operations in the satellite system.

Operations of the entire system is explained below. FIG. 7 is a flow chart showing operations in the satellite system 1. Operations in the ground station 2 are also described together with this description. The satellite system 1 operates in synchronism with the timing outputted from the timing generator 12. Namely, time is counted up each time all of the operations shown in FIG. 7 are finished (step S1). The equipment A1 to An generate data at arbitrary timing. This data contains the data generation time based on the time information received from the timing generator 12. In the convolution processor 11, convolution processing is carried out with respect to the data generated by the equipment A1 to An, and edited with a format of a transfer format (VCDU) with a fixed length. Generally the equipment A1 to An send the output data to the transmitter 20.

The time frame generator 13 generates a time frame at a required timing, and sends the time frame to the frame selecting section 14. This timing will be called as a distribution timing. When a request for output of a time frame is issued from the timing generator 12 (step S2), the frame selecting section 14 preferentially treats this request, and then the time frame is sent to the transfer frame generator 15 in such a way that the contents of the time frame and the actual time match with each other. In the transfer frame generator 15, synchronization code, error correction code or the like are appended to the frame, and the frame is outputted to the transmitter 20. The time is distributed as described here (step S3). If it is not the time to output VCDU, system control is returned to step S1 (step S4).

When the transfer frame is received by the receiver 30 of the ground station, time at which the frame is received is appended to the received transfer frame in order to establish accurate time correlation between the transfer frame and ground time. Thus, a time correlation between the time in the satellite system 1 included in the time frame and the actual time can be established.

If it is determined in step S4 that it is time to output VCDU, then it is determined in step S5 as to whether it is time to output VCDU of time or not. If it is determined that it is time to output VCDU of time (step S5, "Yes"), VCDU of time is edited (step S6), and the edited VCDU of time is outputted (step S8). On the other hand, if it is not the time to output VCDU of time (step S5, "No"), VCDU editing of equipment data is performed (step S7), and the edited VCDU of equipment data is outputted (step S8).

Figure 8:
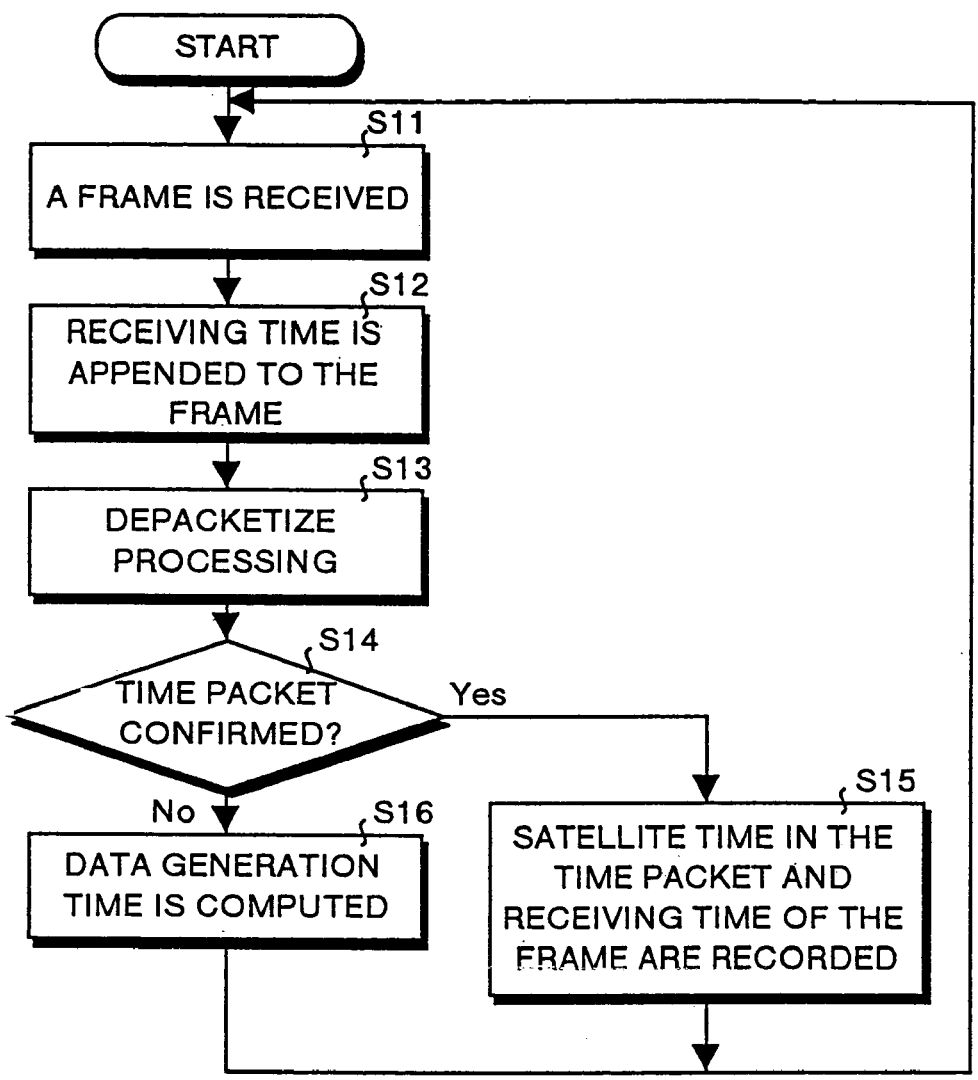
FIG. 8 is a flow chart showing receiving operation in a ground station.

Detailed description is made for a receiving operation in the ground station 2. FIG. 8 is a flow chart of the receiving operation in the ground station 2. A frame is received (step S11) and data regarding the receiving time is appended to this frame (step S12). The time appended here is the time counted in the ground station 2.

When the receiving time is appended to the received frame as described above, the received frame is subjected to depacketize processing for subdividing the received frame into packets (step S13). When the time packet included in the time frame is confirmed (step S14, "Yes"), the satellite time stored in the time packet and the receiving time of the frame are recorded in a correlated form (step S15). Then the processing is returned to the above described step S11. On the other hand, when the time packet can not be confirmed (step S14, "No"), data generation time is computed (step S16). Then the processing is returned to the above described step S11.

Figure 9:
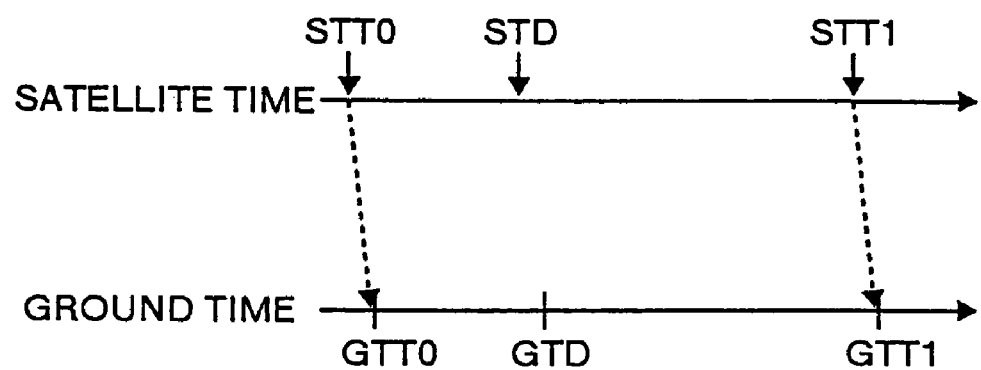
FIG. 9 explains how the time of generation of data is computed.

Next, a method for computing the data generation time will be explained. FIG. 9 explains how the data generation time is computed. In FIG. 9, STT0 and STT1 indicate satellite times when a time frame is generated, and STD indicates satellite time when the data is generated. GTT0 and GTT1 indicate ground time when the time frames (generated at time STT0 and STT1 respectively) are received respectively, and GTD indicates ground time corresponding to the satellite time STD.

Of the six times, namely the satellite times STT0, STT1, STD, and ground times GTT0, GTT1, GTD, all the times other than the ground time GTD are known. Accordingly, computation of data generation time means the computation of this ground time GTD.

In the example shown in FIG. 9, the ground time GTD can be obtained from the following expression (1) or (2):

$$GTD=GTT0+(STD-STT0) \quad (1)$$

$$GTD=GTT1+(STD-STT1) \quad (2)$$

Figure 10:
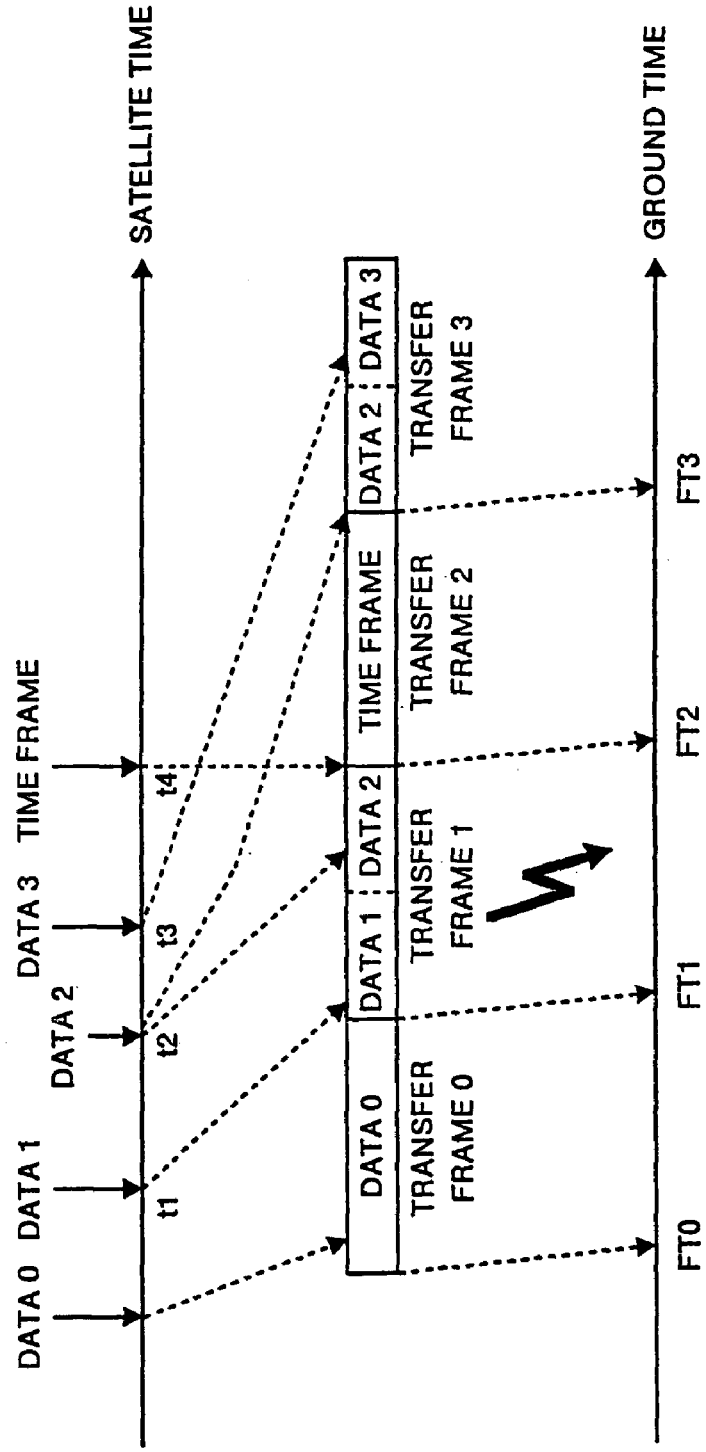
FIG. 10 is a view showing operations for generating data and appending time to the generated data.

Next description is made for time appending in the satellite system 1. FIG. 10 is a view explaining generation of data and the operation for appending time to this data. In this figure, t1, t2, and t3 are timings in the satellite system when data 1, data 2, and data 3 are generated respectively, namely the satellite times. Data 1 is stored in the transfer frame 1 and outputted. Data 2 is convoluted in the transfer frame 1 and transfer frame 3 and then are outputted. Data 3 is stored in the transfer frame 3 and then is outputted. When the data is outputted, the data 1, 2, 3 are transmitted to the ground station 2 along with the timing t1, t2, t3 indicating the data generation time included therein.

The transfer frame 2 is a time frame, and is transmitted to the ground after including in it a header time t4 of the transfer frame. FT0, FT1, FT2, and FT3 are ground times when the transfer frames 1, 2, and 3 are received respectively. The time t1 when the data 1 is generated and the time when the transfer frame with the data 1 stored therein is transmitted are uncertain depending on the situation. Therefore, the time when the data 1 is generated can not be correlated from the ground time FT 1. However, because the transfer frame 2 which is a transfer frame dedicated for time transmission is included, a time correlation between the satellite time t4 and the ground time FT2 can be established from the received time FT2. By calculating reversely from this time FT2, it is possible to determined which of the ground time corresponds to the satellite time t1.

Time set in the time frame is the header time of the frame. For instance, assuming that a transmission rate is 1/1048576 bps ($=1/2^{20}$ bps) and further assuming that one frame contains 8192 bits ($=2^{13}$ bits), then 128 ($=2^{7}$) transfer frames are generated per second. Assuming that a time unit in the satellite system is 1/262144 ($=1/2^{18}$) sec and the timer length is 32 bits, then satellite time at the header of each transfer frame becomes 00000800h, 00001000h, 00001800h, . . . . Assuming that one time frame is inserted after every 64 seconds, then a time frame may be generated and outputted at the satellite time of 01000000h, 02000000h, 03000000h, . . . .

It is not necessary to output this time frame periodically. The time frame may be outputted only in response to a request from the ground station 2. It is important to match the header time of this time frame with the time information included therein. As in the example described here, by employing the configuration in which the satellite time is synchronized with the transfer frame and at the same time a lower digit of time is zero at the header of the frame, satellite time at the first rise position of the header bit can be identified. By identifying the ground time at the first rise point in the ground station 2, even in a case of data transfer at a slow rate in which several tens of microseconds are required for transferring 1-bit data, accurate synchronization between the ground time and satellite time can be achieved.

Figure 11:
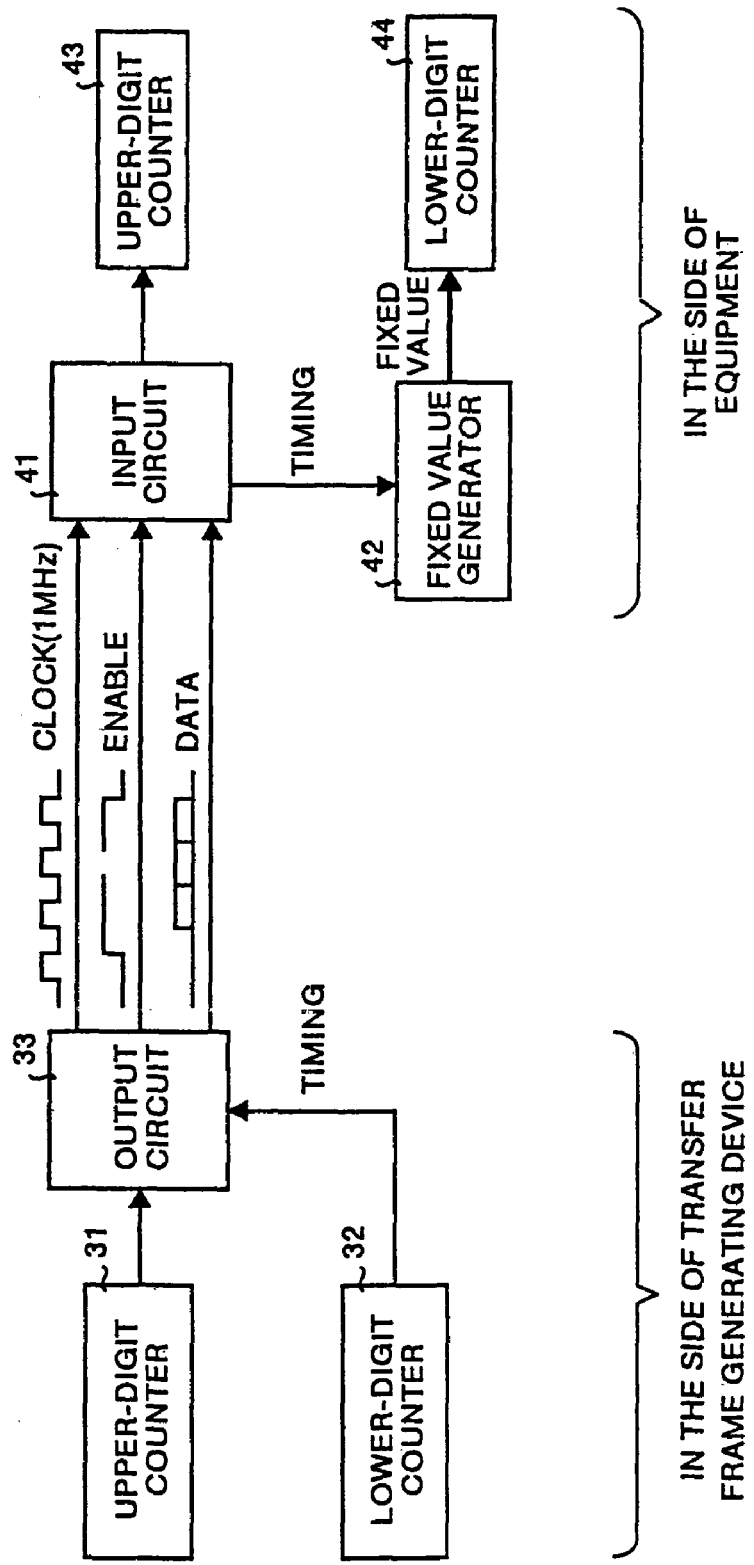
FIG. 11 is a block view showing synchronous configuration in the satellite system.
Figure 12:
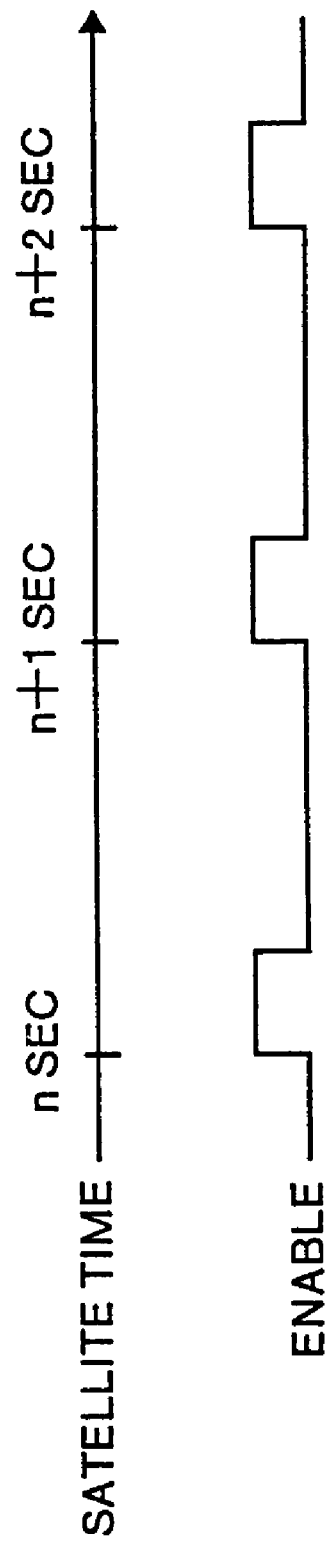
FIG. 12 shows an example of time synchronization in the satellite system.

Next, a method for synchronizing the time among the equipment A1 to An will be explained. At first description is made for configuration for synchronization. FIG. 11 is a block diagram showing configuration of synchronization of time between the transfer frame generating device 10 and the equipment A1 to An. FIG. 12 shows an example of time synchronization between the transfer frame generating device 10 and the equipment A1 to An. In FIG. 11, the transfer frame generating device 10 comprises a upper-digit counter 31, a lower-digit counter 32, and an output circuit 33. On the other hand, each of the equipment A1 to An has a common configuration comprising an input circuit 41, a fixed-value generator 42, an upper-digit counter 43, and a lower-digit counter 44. The upper-digit counters 31 and 43 indicate a time above second, while the lower-digit counters 32 and 44 indicate the fraction of the second.

In order to precisely synchronize the time in the equipment A1 to An on a satellite with the time in the transfer frame time, it is necessary to distribute a clock from the timing generator 12. Time information having the same timing as that in the transfer frame can be generated by using the distributed clock in each of the equipment from the time information received from the timing generator 12 as a starting point. When data for the equipment A1 to An is generated, this time information is appended to the data as a data generation time.

As shown in FIG. 12, it is assumed herein that the transfer frame generating device 10 in the satellite system 1 transmits a 1 MHz ($2^{20}$) clock to each of the equipment A1 to An from the upper-digit counter 31 and the lower-digit counter 32. The equipment A1 to An make the counters operate according to this clock. The transfer frame generating device 10 transmits a time information through the upper-digit counter 31 at every second, namely when the lower-digit counter 32 has become zero.

When each of the equipment A1 to An in the receiving side receives this time information through the input circuit 41, the equipment stores this time information in the upper-digit counter 43, and also stores a fixed-value from the fixed value generator 42 in the lower-digit counter 44. It should be noted that data transfer between the transfer frame generating device 10 and each of the equipment A1 to An is performed based on the enable state of the output circuit 33. The timing when the output circuit 33 is enabled is generated at n second, n+1 second, n+2 second, . . . of the satellite time.

In this example, as time information is stored in 24 bits after a border between seconds, so that 00018h is stored and then counting-up is continued. With this method, an error in time synchronization in the satellite system 1, namely between the transfer frame generating device 10 and each of the equipment A1 to An can be suppressed to the level of the delay in the interface element. Therefore, time synchronization with an error of only around several tens of nanoseconds, or several hundreds of nanoseconds can be achieved.

A separate ID flag may be provided to the transfer frame generating device 10 and to each of the equipment A1 to An in data in the interface so that the information other than the time information can be transmitted through the same interface. With the configuration in which time information is outputted periodically, even when the time information and the information other than the time information are outputted at the same timing and in case the time information can not be outputted, because the clocks are transmitted, an internal counter in the receiving side continues to operate and time synchronicity can be maintained.

As described above, with this embodiment, it is possible to remove uncertain elements for deciding time such as residing of packet data in the satellite system or drift of satellite time, and time synchronization between the satellite system 1 and the ground station 2 can be achieved with a relatively simple configuration.

By fixing the time information when the data was generated, the necessity of being aware of the time required for data processing or packet generation is eliminated, so that independency of equipments involved in data generation is improved, and with this feature system construction becomes easier, and also decision of time of generation of observation data requiring long time and sophisticated processing can easily be made.

In the satellite system 1, a time frame to be used for establishing time correlation between the satellite system 1 and the ground station 2 is inserted between transmission frames at an arbitrary timing, and the ground station 2 acquires time of generation of data inside the satellite system according to the received time frame. With this, time correlation between the satellite time and the ground time can be established only by using the time frame, so that it is possible to determine the data generation time with a simple configuration.

Further, because the transmission frame is generated by packetizing the data generated in the satellite system 1 with the telemetry formation based on recommendation by CCSDS, complicated data processing can be executed.

Further, transmission frame is generated in the satellite system 1 by using the observation data generated from a plurality of equipments A1 to A1 mounted thereon, so that it is possible for the ground system 2 to acquire a result of observation by the satellite.

Further, synchronization between the satellite time and the internal time of each of the equipments A1 to An is achieved by distributing time clocks to the equipments A1 to An in the in the satellite system 1, so that monolithic time management can be realized in the satellite system 1.

Further, in the satellite system 1, satellite time is appended to data generated in each of the equipments A1 to En, so that time management can be realized for each data in the satellite system.

In the satellite system 1, satellite time is generated by counting clocks each synchronized to a bit rate of the transmission frames, and a portion of the satellite time below a time required for transmitting one frame is set to zero at the head of each transmission frame, so that a fraction of satellite time is eliminated, which insures precise synchronization.

In the satellite system 1, satellite time may be corrected according to change in temperature, and in this case a time error can be suppressed to an allowable level according to temperature conditions in the satellite system 1, and an operation for correcting satellite time according to change of temperature in the satellite system 1 is not required in the ground station 2.

Figure 13:
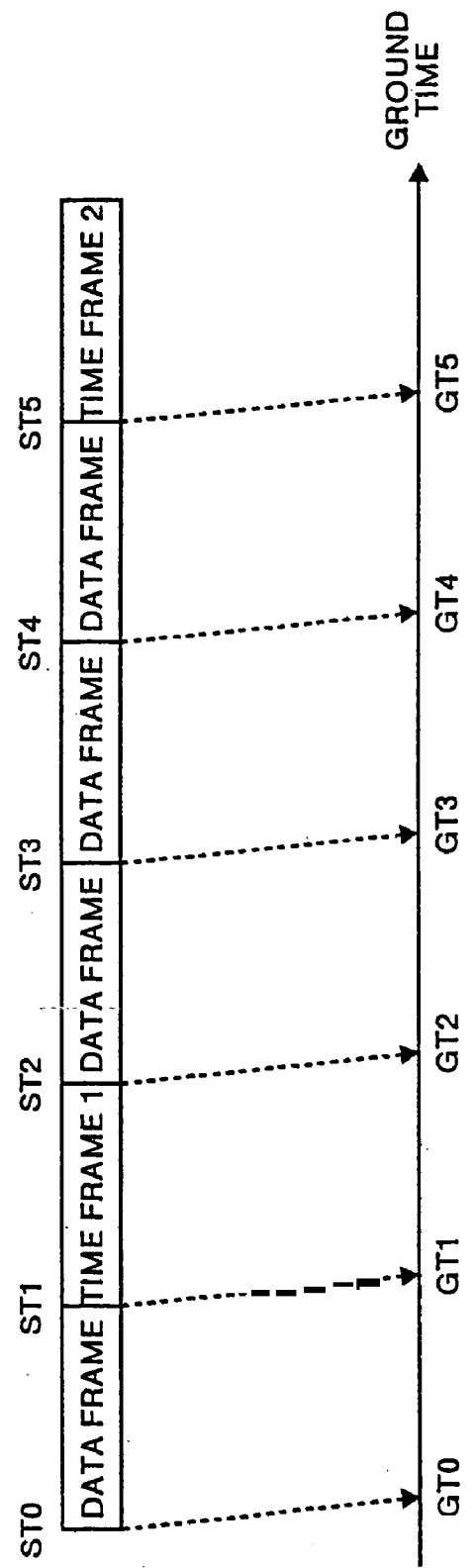
FIG. 13 is a view showing high precision time appending.

Next, description is made for variants of the present invention. At first description is made for realization of high precision time correlation. FIG. 13 is a view showing high precision time correlation. The method of realizing time correlation between satellite time and ground time shown in FIG. 10 uses only one time frame. However, precision can be increased by using two time frames. As shown in FIG. 13, it is assumed herein that header times of the two time frames in the satellite side are ST1 and ST5, and respective receiving times are GT1 and GT5.

A problem will not arise if the satellite time is correct. However, in reality, because the time is generated using, for instance, a quartz oscillator, there is generally generated an error of the order of several ppm to several tens of as compared to the official time. When the oscillation frequency of the quartz oscillator is completely the same as the official value, then ST5 and ST1, and GT5 and GT1 will have exactly the same values. However, in reality, differences in the oscillation frequency causes the timers to become faster or slower with respect to the actual time.

In order to suppress such a time error as much as possible, data generation time in a satellite can be determined by computing an average oscillation frequency Fa, of the timing generator 12 which generates the satellite time, using the following equation (3):

$$Fa=(ST5-ST1)/(GT5-GT1) \quad (3)$$

An orbiting satellite generally makes a one rotation around the Earth in around 90 minutes. In such a case, for instance, by deciding GT1 and ST1 in one rotation from the communicating with the ground station and then deciding GT5 and ST5 in the next rotation, average oscillation frequency Fa during this time period can be decided.

If data generation time obtained in the rear side of the Earth and recorded in the data recorder or the like is ST3, time GT3 can be decided by adjusting advance or delay at GT1 or GT5 to zero through the following equation:

$$GT3=(ST3-ST1) \times Fa+GT1 \quad (4)$$

The above relationship can be rewritten as the following expression (5) with reference to FIG. 9.

$$GTD=GTT0+(STT1-STT0)/(GTT1-GTT0) \times (STD-STT0) \quad (5)$$

Thus, two different satellite times are inserted between transmission frames in the satellite system 1 at two different timings. In the ground station 2, average frequency of satellite time is computed from a time interval between the two satellite times and from the time interval between the ground times corresponding to the two satellite times. Then, data generation time in the satellite system is computed according to the average frequency and the amount of drift from the official frequency of the satellite time. Accordingly, it becomes possible to correct the error due to non-matching time in the satellite system 1 and that in the ground station 2, so that accurate time of generation of data which is generated in the satellite system can be acquired.

Further, by correcting a time error because of a change in the oscillation characteristics due to a change in the temperature in an quartz oscillator by means of the methods disclosed by the same applicant in Japanese Patent Laid-Open Publication No. HEI 4-319695 and in Japanese Patent Laid-Open Publication No. HEI 5-273365 time can be decided more accurately. It should be noted that information regarding time correction is not always available when the data is generated. However, in such a case, the precision can be improved by interpolating the information regarding time correction corresponding to the data generation time.

Figure 14:
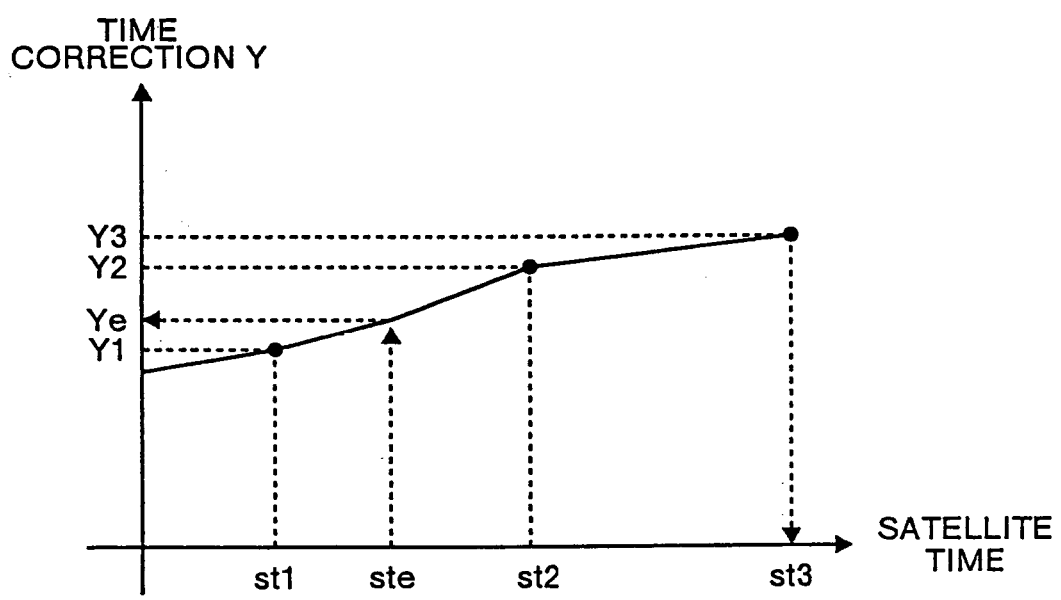
FIG. 14 is a graph showing relation between a time correction value and satellite time.
Figure 15:
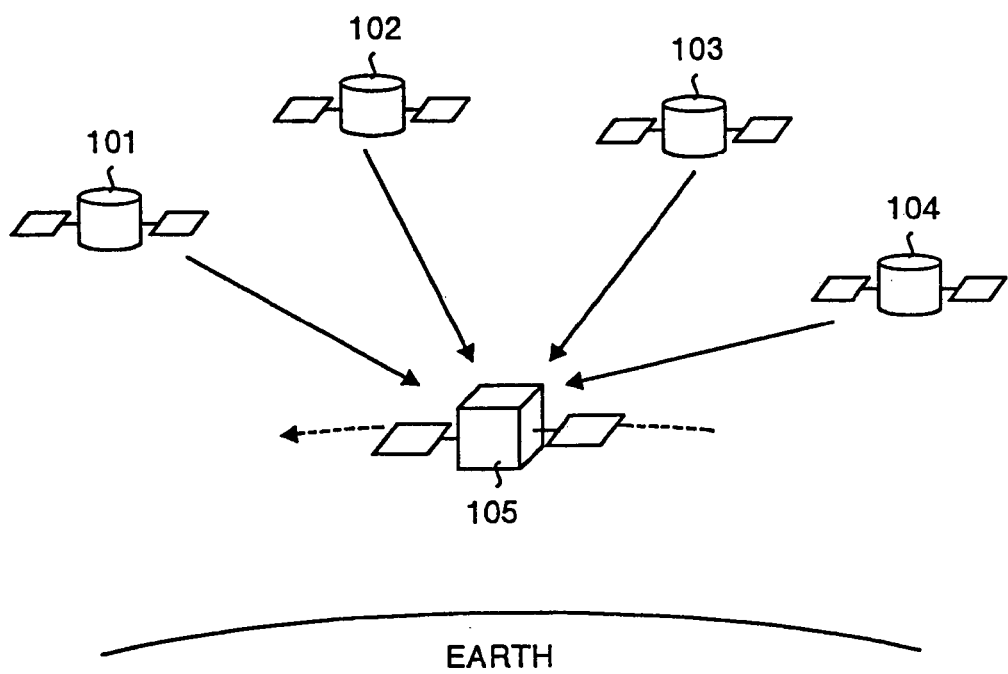
FIG. 15 is a block diagram showing a commonly used GPS system.

FIG. 14 shows an example of such an interpolation. As shown in this figure, information regarding time correction Y1, Y2, and Y3 is available at the satellite times st1, st2, st3 respectively. The data generation time ste is included in the data, however, the data does not have the information regarding time correction. In such a case, information regarding time correction Ye corresponding to the time ste can be obtained by interpolation from the satellite times and information regarding time correction by means of polynomial approximation or the like. By using the Ye obtained in this way, a correction processing for the data generation time ste is preferably carried in order to determine an accurate correlation between ground time and the data generation time ste.

The above relationship can be rewritten as the following expression (6) with reference to FIG. 9:

$$GDT=GTT0+((STT1-SE1)-(STT0-SE0))/(GTT1-GTT0) \times ((STD-SED)-(STT0-SE0)) \quad (6)$$

Herein SE0, SE1, and SED indicates an amount of error at timing STT0, STT1, and STD respectively.

In the satellite system 1, an amount of change in the frequency to be used for obtaining satellite time is estimated in response to a change in the internal temperature, and time of generation of data in the satellite system 1 is corrected taking into account the estimated change in the frequency in the ground system. Therefore, accurate data generation time can be acquired by taking into account the satellite time in the satellite system 1 in the ground system.

In the present invention, the satellite system inserts a time frame to be used for establishing a time correlation between the satellite system and the ground system between the transmission frames at an arbitrary timing, and the ground system acquires the time of generation of data in the satellite system according to this time frame. Thus, a time correlation between the time in the satellite and that on the ground can be established only by using the time frame, whereby there is provided the advantage that time of generation of data can precisely be determined with a simple configuration.

Further, the transmission frame is generated by packetizing the data generated in the satellite system, whereby there is provided the advantage that a time synchronizing system capable of executing complicated data processing can be obtained.

Further, the satellite system generates the transmission frame utilizing the observation data generated in a plurality of equipments mounted thereon, whereby there is provided the advantage that it is possible to obtain a time synchronizing system capable of acquiring a result of observation in the satellite in the ground system.

Further, the satellite system distributes a time clock to each of the equipment and synchronizes the internal time in satellite with of the internal time in each of the equipment, whereby there is provided the advantage that it is possible to acquire a time synchronizing system capable of realizing a centralized time management in the satellite system.

Further, the satellite system appends the satellite time to the data generated in each of the equipment, whereby there is provided the advantage that it is possible to obtain a time synchronizing system capable of realizing time management of data in the satellite system.

Further, the satellite system generates the satellite time by counting clocks each synchronized to a bit rate of a transmission frames, and set an entire portion of the satellite time below time required for transmission of one frame to zero at the head of a transmission frame, whereby there is provided the advantage that it is possible to obtain a time synchronizing system capable of eliminating fraction of satellite time and insuring precision in time synchronization.

Further, in the satellite system, satellite time is corrected depending upon the changes in the temperature, whereby there is provided the advantage that it is possible to obtain a time synchronizing system capable of suppressing error in time due to a change in the internal temperature of the satellite system.

Further, the satellite system inserts satellite time at two different timings between the transmission frames, while the ground system acquires an average frequency of satellite time from a time interval between these two satellite times inserted between the transmission frames and a time interval between the ground times corresponding to these two satellite times. Then, the ground system corrects the time of generation of data in the satellite from the above average frequency and the amount of drift from the official frequency of the satellite time. Therefore, there is provided the advantage that it is possible to obtain a time synchronizing system capable of acquiring accurate time of generation of data in the satellite system.

Further, the satellite system estimates the amount of change in the frequency to be used for acquiring the satellite time according to a change of the internal temperature, and the ground system corrects the time of generation of data in the satellite system taking into account the estimated change in the frequency. Therefore, there is provided the advantage that it is possible to obtain a time synchronizing system capable of acquiring accurate time of generation of the data in the ground system by taking into account the satellite time in the satellite system.

In the present invention, a time frame to be used for establishing a time correlation between the satellite system and the ground system is generated, and this time frame is inserted, when the frames are transmitted, at an arbitrary timing between the transmission frames to generated a transfer frame. Therefore, time correlation between the satellite time and the ground time can be established in the ground system utilizing this time frame. Thus, there is provided the advantage that it is possible to obtain a time synchronizing system capable of determining data generation time precisely with a simple configuration.

Further, a convolution processor is provided for generating the transfer frames by packetizing the generated data, whereby there is provided the advantage that it is possible to obtain a time synchronizing system capable of executing complicated data processing.

With the present invention, the transmission frame is generated utilizing the observation data generated in a plurality of equipments mounted on the satellite system, whereby there is provided the advantage that it is possible to obtain a satellite system capable of providing a result of observation by the satellite system to the ground system.

Further, satellite time preserved in the satellite system is synchronized with the internal time in each of the equipment by distributing time clocks to each equipment, whereby there is provided the advantage that it is possible to obtain a satellite system capable of realizing monolithic time management.

Further, satellite time is appended to data generated in each of the equipment, whereby there is provided the advantage that it is possible to obtain a satellite system capable of realizing time management for each data.

Further, satellite time is generated by counting clocks each synchronized to a bit rate of the transfer frames, and an entire portion of satellite time below the time required for transfer of one frame is set to zero at the head of the transfer frames. Therefore, there is provided the advantage that it is possible to obtain a satellite system capable of eliminating a fraction of satellite time and insuring precision in synchronicity.

Further, satellite time is corrected according to the changes in the temperature, whereby there is provided the advantage that it is possible to obtain a satellite system capable of suppressing a time error due to the internal temperature conditions.

In the present invention, time of generation of data in the satellite system is acquired according to a time frame inserted between received frames to be used for establishing a time correlation between the satellite system and the ground system. Thus, time correlation between the satellite system and ground system can be realized according to the time frame obtained from the satellite system. Therefore, there is provided the advantage that it is possible to obtain a ground system capable of precisely determining data generation time with a simple configuration.

Further, an average frequency of satellite time is acquired from the time interval between two different satellite times and the time interval between the ground times corresponding to the two satellite times, and time of generation of data in the satellite system is corrected from this average frequency as well as from the amount of drift from then official frequency of satellite time. With this, error between time progress in the satellite system and that in the ground system can be corrected, whereby there is provided the advantage that it is possible to obtain a ground system capable of acquiring accurate time of generation of data in the satellite system.

Further, time of generation of data in the satellite system is corrected by taking into account the change in the frequency estimated in the satellite system, whereby there is provided the advantage that it is possible to obtain a ground system capable of acquiring accurate time of data generation by taking into account the satellite time in the satellite system.

In the present invention, a time frame to be used for establishing a time correlation between the satellite system and the ground system is generated, and a transfer frame is generated, when frames are transmitted, by inserting the generated time frame at an arbitrary timing between the transmission frame. Time correlation between the satellite time and ground time can be established based on this time frame. Thus, there is provided the advantage that it is possible to obtain a time synchronizing system capable of precisely deciding accurate time of generation of data with a simple configuration.

In the present invention, when receiving the frames, time of generation of data in the satellite system is acquired according to the time frame inserted between the received frames to be used for establishing a time correlation between the satellite system and the ground system, and data is analyzed according to the time of generation of data. Time correlation between the satellite system and ground system can be established according to the time frame obtained from the satellite system and data can be analyzed using an accurate time. Therefore, there is provided the advantage that it is possible to obtain a time synchronizing method capable of acquiring a result of data analysis based on accurate time in the satellite system.

In the present invention, processing for generation of a time frame to be used for establishing a time correlation between the satellite time and the ground system is executed, and then a transfer frame is generated by inserting, when transmitting the frames, this time frame at an arbitrary timing between the transmission frames. Time correlation between the satellite system and the ground system can be established according to this time frame by using a computer program. Thus, there is provided the advantage that it is possible to obtain a recording medium containing a computer program capable of precisely determined the time of generation of data with a simple configuration.

In the present invention, when receiving the frames, time of generation of data in the satellite system is computed according to the time frame inserted between the received frames, to be used for establishing a time correlation between the satellite system and the ground system, and data is analyzed according to the computed time of generation of data. Data can be analyzed according to the accurate time by establishing a time correlation between the satellite time and the ground time according to the time frame obtained from the satellite system using a computer program. Thus, there is provided the advantage that it is possible to obtain a recording medium containing a computer program capable of acquiring a result of analysis based on accurate time.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A time synchronization system comprising:
a satellite system transmitting a time frame by inserting the time frame between transmission frames at a specified timing, wherein the time frame comprises a frame containing information that indicates a time in the satellite for time synchronization; and
a ground system acquiring a ground time at which data is generated in the satellite system based on the information indicating a time in the satellite in the time frame inserted between the transmission frames, wherein the satellite system appends a satellite time to data in the transmission frames when the data is generated in the satellite system, wherein
the time in the satellite for time synchronization of the time frame can be matched to a time in the ground system with substantially higher accuracy than the satellite time appended to the data in the transmission frames, and where the acquiring of the ground time at which the data is generated in the satellite system, is also based on the satellite time appended to the data.

2. A time synchronization system according to claim 1, wherein the satellite system generates the transmission frames by packetizing the data generated in the satellite system.

3. A time synchronization system according to claim 1, wherein
the satellite system comprises a plurality of equipments each generating a set of observation data and the data generated in the satellite system comprises the observation data.

4. A time synchronization system according to claim 3, wherein
each of the equipments has an internal time, and the satellite system distributes a time clock to each of the equipments and synchronizes the internal time of each of the equipment with the internal satellite time.

5. A time synchronization system according to claim 1, wherein there are differing times between generation of the generated data and transmission of frames containing the generated data.

6. A time synchronization system comprising:
a satellite system transmitting a time frame by inserting the time frame between transmission frames at a specified timing, wherein the time frame comprises a frame containing information that indicates a time in the satellite for time synchronization; and
a ground system acquiring a ground time at which data is generated in the satellite system based on the information indicating a time in the satellite in the time frame inserted between the transmission frames, wherein the satellite system appends a satellite time to data in the transmission frames when the data is generated in the satellite system, wherein
the satellite system comprises a plurality of equipments each generating a set of observation data and the data generated in the satellite system comprises the observation data and the data generated in the satellite system comprises the observation data, each of the equipments, the satellite system distributes a time clock to each of the equipments and synchronizes the internal time of each of the equipment with the internal satellite time, and
the satellite system corrects the satellite time depending upon a change in temperature.

7. A time synchronization system comprising:
a satellite system transmitting a time frame by inserting the time frame between transmission frames at a specified timing, wherein the time frame comprises a frame containing information that indicates a time in the satellite for time synchronization; and a ground system acquiring a ground time at which data is generated in the satellite system based on the information indicating a time in the satellite in the time frame inserted between the transmission frames, wherein the satellite system appends a satellite time to data in the transmission frames when the data is generated in the satellite system, wherein there are differing times between generation of the generated data and transmission of frames containing the generated data, and the satellite system estimates an amount of change in the frequency to be used for acquiring satellite time depending upon a change in the internal temperature, and transmits the estimated amount of change in the frequency by inserting the estimated amount of change into the transmission frame, while the ground system corrects the ground time at which the data is generated in the satellite system by taking into account the estimated amount of change in the frequency.

8. A time synchronization system comprising:

a ground system receiving from a satellite system a stream of frames comprising data frames and time frames, where the data frames carry data, where the time frames are between the data frames, where the time frames each contain a satellite time, where the satellite times each are generated at a substantially consistent length of time before transmission, and where the times in the time frames are capable of being used by the ground system to determine corresponding ground times at which data in the data frames were generated or acquired in the satellite system, wherein some of the data frames include a data time of their respective data, wherein some data frames have a preceding time frame or a following time frame, respectively preceding or following the data frame, and where, a difference in time between the data time of a data frame and the satellite time of its preceding or following time frame can substantially vary between successive data frames, and where the ground time of the generation or acquisition of data in a data frame is determined based on the satellite time of its preceding or following time frame, the data time of the data frame, and a ground time of receiving the preceding or following time frame.

* * * * *